(12) United States Patent
Daun et al.

(10) Patent No.: US 10,287,116 B2
(45) Date of Patent: May 14, 2019

(54) METHOD AND SYSTEM FOR LOADING A MOTOR VEHICLE

(71) Applicant: Bayerische Motoren Werke Aktiengesellschaft, Munich (DE)

(72) Inventors: Nico Daun, Munich (DE); Atanas Gegov, Munich (DE); Daniel Liebau, Landshut (DE); Claudia Langner, Landshut (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 338 days.

(21) Appl. No.: 15/187,103

(22) Filed: Jun. 20, 2016

(65) Prior Publication Data

US 2016/0304299 A1 Oct. 20, 2016

Related U.S. Application Data

(63) Continuation of application No. PCT/EP2014/074314, filed on Nov. 12, 2014.

(30) Foreign Application Priority Data

| Dec. 18, 2013 | (DE) | 10 2013 226 461 |
| May 21, 2014 | (DE) | 10 2014 209 663 |
| Nov. 12, 2014 | (DE) | 10 2014 223 031 |

(51) Int. Cl.
*B65G 67/00* (2006.01)
*G09B 5/12* (2006.01)
(Continued)

(52) U.S. Cl.
CPC .............. *B65G 67/00* (2013.01); *G06Q 10/08* (2013.01); *G06Q 50/28* (2013.01); *G09B 5/125* (2013.01)

(58) Field of Classification Search
CPC .... G06Q 10/08; G06Q 50/28; G06Q 30/0282; G06Q 30/0645; B60N 2/005;
(Continued)

(56) References Cited

U.S. PATENT DOCUMENTS

| 2001/0041948 A1 | 11/2001 | Ross et al. |
| 2007/0265754 A1 | 11/2007 | Curtis et al. |

(Continued)

FOREIGN PATENT DOCUMENTS

| DE | 39 07 376 A1 | 9/1990 |
| DE | 42 45 047 B4 | 9/2010 |

(Continued)

OTHER PUBLICATIONS

German Search Report issued in counterpart German Application No. 10 2013 226 461.5 dated Jan. 24, 2014 with partial English translation (10 pages).

(Continued)

*Primary Examiner* — John H Le
(74) *Attorney, Agent, or Firm* — Crowell & Moring LLP

(57) ABSTRACT

A method is provided for loading a motor vehicle using an optimized loading strategy. The optimized loading strategy is determined with the help of a computer. The method includes the following acts: acquiring characteristics of a plurality of objects to be transported, using a recording device, for example a camera and/or a scanner and/or using a reader device such as an RFID receiver; using the acquired characteristic to determine the dimensions, particularly a height, width and depth of each of the objects; establishing the optimized loading strategy for the motor vehicle as a function of the dimensions of the objects that have been determined and depending on the type of motor vehicle being loaded; and visualizing the loading strategy.

16 Claims, 3 Drawing Sheets

(51) Int. Cl.
*G06Q 10/08* (2012.01)
*G06Q 50/28* (2012.01)

(58) Field of Classification Search
CPC .... B60N 2/0232; B60N 2/0244; B65G 67/00; G06K 2017/0051; G09B 5/125
USPC ........ 702/127, 173, 174, 155, 156; 700/226; 701/34.4, 49, 9; 707/770; 250/221
See application file for complete search history.

(56) References Cited

U.S. PATENT DOCUMENTS

| | | |
|---|---|---|
| 2011/0078182 A1 | 3/2011 | Fenyes et al. |
| 2011/0234761 A1* | 9/2011 | Yumiba .................... B60R 1/00 348/46 |
| 2012/0259509 A1 | 10/2012 | Wittorf et al. |
| 2016/0169665 A1* | 6/2016 | Deschenes ......... G01N 21/8806 356/606 |

FOREIGN PATENT DOCUMENTS

| | | |
|---|---|---|
| DE | 10 2011 016 641 A1 | 10/2012 |
| DE | 10 2013 004 537 A1 | 9/2013 |
| EP | 1 962 236 A1 | 8/2008 |
| EP | 2 083 381 A1 | 7/2009 |
| JP | 58-6841 A | 1/1983 |
| JP | 2012-137304 A | 7/2012 |

OTHER PUBLICATIONS

International Search Report (PCT/ISA/210) issued in PCT Application No. PCT/EP2014/074314 dated Jun. 8, 2015 with English translation (seven pages).
German-language Written Opinion (PCT/ISA/237) issued in PCT Application No. PCT/EP2014/074314 dated Jun. 8, 2015 (six pages).
German Search Report issued in counterpart German Application No. 10 2014 209 663.4 dated Jul. 30, 2014 with partial English translation (12 pages).
German Search Report issued in counterpart German Application No. 10 2014 223 031.4 dated Jul. 2, 2015 with partial English translation (14 pages).
Chinese Office Action issued in Chinese counterpart application No. 201480068931.3 dated Nov. 27, 2018, with partial English translation (Twenty Five (25) pages).

\* cited by examiner

METHOD AND SYSTEM FOR LOADING A MOTOR VEHICLE

CROSS REFERENCE TO RELATED APPLICATIONS

This application is a continuation of PCT International Application No. PCT/EP2014/074314, filed Nov. 12, 2014, which claims priority under 35 U.S.C. § 119 from German Patent Application Nos. 10 2013 226 461.5, filed Dec. 18, 2013, 10 2014 209 663.4, filed May 21, 2014, and 10 2014 223 031.4, filed Nov. 12, 2014, the entire disclosures of which are herein expressly incorporated by reference.

BACKGROUND AND SUMMARY OF THE INVENTION

The invention relates to a method and a corresponding system for the optimized loading of a motor vehicle. The loading of a vehicle is normally planned and performed independently by a user of the vehicle. In particular, the loading of multiple objects such as luggage or the like often results in difficulty because of insufficient space, or because various loading options have to be tried out first to be able to load all objects into the vehicle (such as a motor vehicle, for example). Problems of this nature are encountered in particular when loading the vehicle with larger objects, such as furniture components, electrical devices or the like, which often do not fit into the vehicle or require lengthy experimentation. This, by the way, can lead to damaging the surface of the vehicle. Furthermore, the loading potential of the vehicle is often not used optimally, and the vehicle is possibly loaded improperly or in a lopsided manner. In doing so, specific loading rules, which are intended to prevent an improper loading, are to be observed for each vehicle. Although such guidelines for the proper loading generally come with each motor vehicle, a user often does not consult them. Especially in case of overloading, there is not only the risk of damaging the vehicle, but also the risk of an accident, which must be avoided.

The object of the present invention is therefore to provide a method and a system that facilitates a simple and safe loading of a motor vehicle by a user.

This and other objects of the invention are attained by a method for calculating a loading strategy for a vehicle, which includes the following steps:

recording the characteristics of a plurality of objects to be transported by way of a recording device such as a camera and/or a scanner, for example, and/or by way of a reader device such as an RFID receiver, for example, using the acquired characteristic to identify dimensions, in particular a height, a width, and a depth, of each of the objects;

determining the loading strategy for the motor vehicle as a function of the identified dimensions of the objects and as a function of the type of vehicle to be loaded, and visualizing the loading strategy.

An aspect of the invention is therefore that a user can load a motor vehicle based on an optimized loading strategy, which is determined as a function of the three-dimensional form of the objects/items to be transported and as a function of the type of vehicle to be loaded. The visualization of the optimized loading strategy allows the user to readily implement the proposed loading strategy. Because the optimal loading strategy is determined with the help of a computer, all facts to be taken into consideration, such as the loading procedure recommended by the manufacturer, the space available in the motor vehicle to accommodate the objects to be loaded, etc., can be taken into account. The user can therefore be sure that he adheres to all regulations and recommendations specific to the vehicle when following the recommended optimized loading strategy.

Preferably, the method according to the invention includes the step of the motor vehicle being loaded by the user according to the optimized loading strategy. The three-dimensional dimensions of the at least one object to be transported are preferably captured by an algorithm that processes a video and/or single images of a camera, in particular a smart phone camera. In doing so, in particular the object(s) to be loaded, such as luggage, for example, is/are placed outside of the car and a video is filmed, with the perspective from which the object is filmed changing slowly. For example, while taking the video, a user can walk around the object. Alternately, it is possible to take several single images from various perspectives, in particular three single images, to record the three-dimensional form of the object to be loaded. The video recording or the individual images can be taken with a camera, preferably a smart phone camera. Methods for the computer-based creation of a 3D-model of an object recorded in this way are principally known in the prior art and are not explained here in detail. What is important is that the dimensions of the object or the objects to be transported can be acquired. To use the vehicle or parts of the vehicle as reference values in the video or the single images, the objects to be loaded are preferably placed in front of the vehicle. The size of the reference objects is known to the computer program and therefore the size of the objects to be loaded can be determined in relation to the reference objects.

In another embodiment of the invention, the recording of characteristics of a plurality of objects to be transported takes place by use of a reader device, for example by an RFID receiver. The RFID receiver is preferably developed in or at the vehicle so that the user has to approach the vehicle with the object that is to be transported or loaded and has an RFID chip or an RFID tag. The dimensions of the object to be loaded are stored on the RFID chip, for example. Furthermore, it is contemplated that information regarding an expiration date, a specification regarding storage requirements and/or a specification regarding temperature requirements is stored on the RFID chip.

Principally, instead of using a portable (smart phone) camera, it is also contemplated using a camera that is integrated in the vehicle, for example in the tailgate or in the bumper of a vehicle. Such a camera could simultaneously serve as a backup camera. The objects to be loaded could then be placed into the field of vision of the camera so that the size and the dimensions of the objects recorded in this way can be acquired based on the determined position of the camera in the vehicle. Furthermore, the size and/or the dimensions of the recorded object is/are acquired by means of a stereo camera Such stereo cameras are located in the rear of a vehicle, for example, to assist the driver in the scope of driver assistance systems. With the help of a stereo camera, a 3D model of the recorded object can be prepared.

It is furthermore contemplated that a light signal transmitter disposed on the vehicle, such as a laser, for example, marks the recorded areas on the ground with the help of a vehicle camera, in particular with the help of a stereo camera of the vehicle. In other words, a laser, for example, can project or render visible the maximum surface area to be recorded by a vehicle camera. The user can then place the objects to be loaded onto the projected or visualized surface area. The object to be loaded can be completely recorded by a camera of the vehicle, in particular a stereo camera, on said projected or visualized surface area.

Furthermore, the dimensions of the at least one object to be transported can be acquired with the help of a characteristic, in particular by means of a product identification device. Such a product identification device may be a barcode, for example. Such a barcode can be scanned in, in particular by use of a smart phone, whereupon the object identified in this manner can be searched in the internet and/or in a database on the object manufacturer's side, for example of the object manufacturer, and the dimensions of the object stored there can be acquired. The characteristic can furthermore be a RFID chip or RFID tag.

Even with this variant, the user has to provide support in that the product identification device is acquired. In this way, it is possible, for example when purchasing furniture or other objects that are generally provided with a product identification device such as a barcode, to determine whether the object to be transported fits into the motor vehicle and whether, if applicable, the rear seat may have to be folded down for this purpose. What is important when acquiring the three-dimensional dimensions of the object to be transported by means of a product identification device is that information about the dimensions and, if applicable, the weight of the object characterized in this way can be obtained via the product identification.

In an embodiment of the invention, it may be provided that the three-dimensional dimensions of the at least one object to be transported are acquired by way of user information provided on a form. The form may be an input screen implemented in a smart phone application, for example, into which a user can enter information about the width, length and height and, in particular, also about the weight and other properties of an object, such as fragility, hazardous material, expiration date, storage condition specifications, temperature condition specifications, and the like.

The method is advantageously performed in a smart phone, on an external server and/or in the motor vehicle to be loaded. It goes without saying that instead of a smart phone, it is also possible to use a tablet PC or similarly suitable terminal device. Purely as an example, the embodiments of the invention are explained here with reference to a smart phone. All steps of the method can be performed either on the smart phone or on an external server or in the motor vehicle to be loaded. Alternately, it is contemplated to perform various method steps at various locations. For example, it is contemplated to acquire the dimensions of the object to be transported using a smart phone, whereas determining the optimized loading strategy for the motor vehicle can be performed on an external server or in the computer of the motor vehicle to be loaded. The visualization of the optimized loading strategy can take place preferably either on the smart phone or in the motor vehicle to be loaded. A data exchange to perform the method can take place between the individual elements with suitable interfaces, in particular via an internet interface of the smart phone or of the motor vehicle to be loaded and an external server, or by a suitable interface, for example a Bluetooth or USB interface between the smart phone and the motor vehicle.

It is also contemplated to implement the method according to the invention in a motor vehicle-specific smart phone application. For example, the method according to the invention can be integrated as an additional function into an already existing vehicle application for a smart phone. The vehicle application stored on the smart phone already knows the smart phone user's vehicle so that a user does not specifically have to enter the type of motor vehicle to perform the method. The vehicle-specific smart phone application can load data about the vehicle type, such as the permissible total weight, a 3D model of the interior space, in particular the trunk, as well as the measurements of the vehicle, from a server of the vehicle's manufacturer and use the appropriate data to determine the optimized loading strategy for the vehicle. Alternately, said data can be already stored in the smart phone or in the vehicle, which makes a corresponding data exchange prior to performing the method obsolete. In the scope of such a motor vehicle-specific smart phone application, not only the user-supported acquiring of dimensions, but also determining the optimized loading strategy for the motor vehicle as well as visualizing the optimized loading strategy for the user can be realized.

If the information required for this is available, the optimized loading strategy for the motor vehicle can be determined taking into account the loading specifications of the respective type of motor vehicle and the maximally useable volume of interior space. The loading specifications can also already be on hand, or they can be downloaded from the manufacturer's server. The same applies to the maximally useable volume of interior space and can furthermore depend on preset user parameters and vary accordingly. For example, it is contemplated that prior to performing the method, a user specifies the number of passengers traveling in the car, or the number of occupied seats, so that the maximally useable interior space volume is reduced correspondingly.

Determining the optimized loading strategy of the vehicle as a function of the acquired dimensions of the at least one object to be transported and as a function of the type of vehicle to be loaded can be performed by a suitable algorithm in a processing unit. Algorithms that deal with the problem of optimal utilization of space in containers ("packing problem") are generally known.

It is furthermore contemplated that the optimized loading strategy for the motor vehicle is determined taking into account a loading strategy prioritized by a user and/or a driver. The user and/or the driver can optionally assign a higher priority to certain objects to be loaded than to other objects. If a user or driver or passenger needs access to an object to be transported during the transport or during a drive, the object should be assigned such a loading position when determining the loading strategy that said object is within reach or on top in the trunk.

The method for calculating a loading strategy usefully also includes an inquiry of the expiration date, a storage condition specification and/or a temperature condition specification for at least one of the objects to be transported, using the characteristics, with the expiration date, the temperature condition specification and/or the storage condition specification of the at least one object being taken into account when determining the loading strategy. The loading strategy can be determined such that, for example, the object to be transported is sufficiently heated or cooled and/or stored in darkness during transport, depending on the respective temperature condition specification and/or storage condition specification. In as far as the precise temperature and/or storage conditions have not been met with respect to an object to be transported, the motor vehicle may be cooled or heated at the storage position of the object. Furthermore, it is contemplated to control the storage options "well-lit" or "shade" with the help of automatic shades and/or a trunk cover.

Advantageously, the optimized loading strategy is visualized for the user on a smart phone display and/or on a motor vehicle display. The visualization on a smart phone display may take place, for example, with a simulated image of the motor vehicle to be loaded when the tailgate is open and objects have been loaded corresponding to the optimized loading strategy determined by the method. Alternately, a simulation of the packing situation according to the optimized loading strategy can take place by means of the smart phone display in terms of the representation in "augmented reality." This is where the camera image of the smart phone is oriented towards the opened tailgate of the motor vehicle to be loaded, and the objects to be loaded are placed virtually via the running camera image of the terminal device. This facilitates a representation of the objects at the calculated optimal place in the actual interior space or trunk of the vehicle to be loaded. The camera image then appears as if the objects to be loaded had already been placed into the vehicle.

Furthermore, there is the option of displaying the calculated optimized loading strategy step-by-step to the user during the visualization. Therefore, there is the option of indicating to the user not only the optimal end condition of the loaded objects, but also the best path for the user to select in order to achieve the proposed final result. There is also the option of providing the objects with numbers in the displayed simulated image of the loaded trunk, which indicates to the user the loading order of the objects.

Another advantageous solution is to display the visualization on a human machine interface (HMI) display (such as Color Info-Display, CID) of the motor vehicle in the area of the center console or on the windshield. As far as the calculation of the optimized loading strategy for the motor vehicle was performed in the smart phone, a data communication between the smart phone and the human machine interface of the motor vehicle is required to represent the optimal loading strategy on the vehicle display. It is also advantageous with this solution that the user's hands are free and the user can therefore regularly view the recommended arrangement on the vehicle display during loading as well.

The optimized loading strategy generated in the second step of the method provides information about the optimal placement of the at least one object to be transported in the motor vehicle. Advantageously, however, it also provides information on how to proceed to achieve the optimal placement, so that for multiple objects to be loaded, the loading order is displayed as well. The optimized loading strategy can also be generated in connection with an already partially loaded vehicle. In other words, the loading strategy takes place taking into account the real time loading. With a reading device, such as an RFID receiver, for example, it can be determined which objects with the corresponding RFID tags are still in the vehicle. Depending on the actual loading situation, it can first be determined which space in the vehicle is still free for loading. For example, a driver or user can be informed during a drive or shopping trip which objects can still be transported or which reloading processes have to be performed to be able to still transport a certain object. Furthermore, it is possible to determine a driving route as a function of the expected loading conditions of the vehicle in real time or before starting the trip. The driving route can be determined by means of a smart phone and/or a computer and/or a navigation system of the vehicle. Coupling the determined loading strategy to a navigation system is particularly advantageous because in real time as well as before starting the trip, various loading conditions may influence the determination of the optimized loading strategy.

Also advantageous is a voice prompting that supports the placement of the at least one object to be transported by a user in the vehicle according to the optimized loading strategy. The voice prompting can, in particular, instruct the user with respect to the order of placement of multiple objects to be loaded. Appropriate support can also be, in particular, offered by optical means, such as light guide elements in form of lasers or LEDS arranged in particular in the trunk, which instruct the user to realize the optimized loading strategy. Furthermore, it is contemplated to develop a light guide element in form of roof lasers in the roof of the vehicle or in the interior trunk lid. In this way, it is possible to visualize or project the exact surface area of the object to be transported, which is to be placed into the vehicle, in the trunk, the foot well or on a rear seat or a folded over rear bench.

It is furthermore contemplated that, as a function of the specific loading strategy, a vehicle door and/or a trunk lid can be opened and/or locked. The determined and/or specific loading location can be signaled, for example, by automatically opening a vehicle door and at the same time closing and/or locking the other vehicle doors as well as the trunk lid. Locking individual doors (side doors or trunk lid) prevents the user and/or driver from arranging the piece of luggage or object to be transported at the wrong place or from introducing it into the vehicle through an unsuitable opening.

Likewise, it is possible to control the exterior and/or interior lighting of the vehicle as a function of the loading strategy. For example, the specific illumination of only one door handle can signal that this is the vehicle door to open for the optimized loading of the object. Furthermore, the door handle lighting of the door to be opened can be lit in a different color than the doors/gates not to be opened.

In addition or alternately, it is contemplated that the interior vehicle lighting is controlled such that only the selected interior lighting near where the object to be transported is to be placed is activated. The interior lighting to be switched on can be reading lamps or a foot well lighting, for example.

The aforementioned problem is also solved by a system intended to generate an optimized loading strategy, in particular using a method according to the invention. The system includes at least one recording device to acquire dimensions, in particular the height, width and depth, of at least one object to be transported in the motor vehicle. Acquiring the dimensions takes place in particular with the help of the user, for example by entering the appropriate data, by scanning an object identifier such as a barcode, or by recording the at least one object to be loaded with a camera. Recording with a camera can take place, for example, by use of a vehicle stereo camera. Furthermore, at least one processing unit is provided to determine the optimized loading strategy for the motor vehicle as a function of the acquired dimensions of the at least one object to be transported and as a function of the type of motor vehicle to be loaded. The processing unit furthermore can calculate a three-dimensional model of the object by way of a video or using multiple images. The recording device may also be part of a processing unit and/or be implemented in the same. Finally, at least one visualization device is provided for the graphical representation of the optimized loading strategy, which can be arranged either in the vehicle or in a smart phone or in a similar terminal device.

The recording device, the processing unit and/or the visualization device can be provided in the motor vehicle to be loaded or in a smart phone. All elements of the system can be arranged either in the motor vehicle to be loaded or exclusively in the smart phone. However, it is also contemplated that one or a plurality of elements are provided in the motor vehicle to be loaded, whereas another element of the system according to the invention is provided in the smart phone. However, in that case, a data communication is required between the motor vehicle to be loaded and the smart phone. If applicable, parts of the system, in particular the processing unit, can be integrated on an external server, for example the server of a vehicle manufacturer.

Furthermore, the system can include a light signal source, in particular a laser, to visualize the space recorded by a camera, a scanner and/or a stereo camera.

To solve the aforementioned problem, a computer-readable medium with instructions for performing the method according to the invention is provided as well if the instructions are executed on a processing unit.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
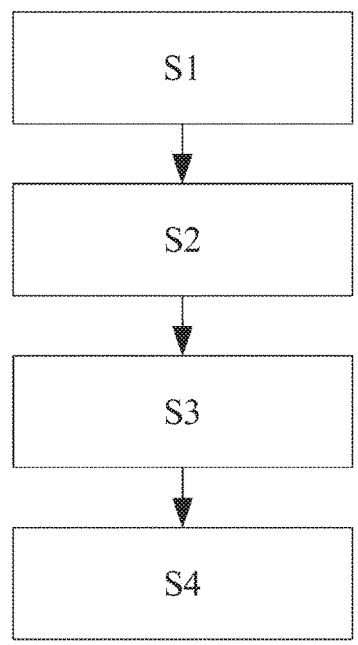
FIG. 1 is a flowchart of a method according to the invention.

FIG. 1 shows a schematic flowchart of the method according to the invention for loading a motor vehicle using an optimized loading strategy. The method is designed such that in a first step, the dimensions of at least one object to be transported are acquired. The data is acquired with the help of the user in that the user provides the system with the dimensions of the object to be transported, for example via a form, or information as to where the dimensions of the object to be transported can be found, for example in a database or in the internet, is supplied to the system.

In an alternate embodiment of the invention, it may be provided that the user records a video of the object(s) to be transported, or single images of the same, with a camera, in particular with his smart phone, which are then used as the basis for acquiring dimensions, in particular the height, width and depth of the at least one object to be transported. It is furthermore contemplated that the user places the object to be transported into an area covered by a stereo camera of the vehicle so that a three-dimensional model and/or image of the object to be transported can be created by means of the stereo camera. Based on the recording of the object to be transported and in particular its dimensions, preferably a three-dimensional model of the at least one object to be transported is created. The three-dimensional object is also used later for the visualization of a calculated optimal loading strategy.

After the object has been recorded and, in particular, after a three-dimensional model thereof has been prepared in the first step S1 of the method, the optimal placement of the objects in the interior space of the vehicle is calculated in a second step S2. To that end, preferably a computer program is used, which can be stored locally on a smart phone or in the motor vehicle or even on an external server, in particular a server of the vehicle manufacturer. After all required data regarding the recorded objects are on hand, the software calculates, in a second step S2 with the help of a suitable algorithm from the "packing problems" category, the optimized loading strategy for the specific motor vehicle to be loaded. To calculate the optimized loading strategy, the type of motor vehicle, and in particular a three-dimensional model of its interior space, have to be on hand.

In the case that one or a plurality of objects no longer fit into the motor vehicle, for example because they are too long and/or to wide, preferably an optical and/or acoustic warning signal is generated. In addition to that, preferably recommendations can be made to the user as to the possible combination of luggage pieces and how the vehicle can be loaded in an advantageous manner. Here it is contemplated, for example, that the algorithm for calculating the optimized loading strategy performs a comparison between the sizes of the recorded objects and the vehicle data. For example, specific loading options for the vehicle may be taken into account, such as, for example, for the loading of skis and snowboards, by folding over the rear seating or by opening a flap in the rear seating.

In the case that one or a plurality of objects no longer fit into the motor vehicle to be loaded, the user may also be given the option of assigning various priorities for multiple objects to be loaded. The object with the highest priority can then be reached easiest when opening the trunk and/or definitely is taken into account in the calculation, whereas objects with a lower priority are taken into account last.

After determining the optimized loading strategy, a visualization of the optimized loading strategy is performed in a third step S3. The visualization is to be performed in particular on a display, for example a smart phone of the user or in the motor vehicle to be loaded, so that the user can readily see how he can best accommodate one or a plurality of objects in a motor vehicle to be loaded.

Several variants are contemplated in the visualization in step S3. For example, a graphical representation of the trunk with the objects placed according to the optimized loading strategy could be shown on a smart phone display.

Alternately, it is contemplated that the result of the calculation of the optimized loading strategy is displayed on a human machine interface (HMI) display of the motor vehicle to be loaded. As far as the calculation of the optimized loading strategy occurred on a smart phone, a communication interface is required to transfer of the calculation result between the smart phone and the human machine interface of the motor vehicle to be loaded. To that end, a USB or a Bluetooth interface can be used, for example. The representation of the optimized loading strategy on a display of the motor vehicle offers the advantage that the user's hands are free and he can keep an eye on the recommended arrangement of the objects to be loaded in the motor vehicle even during the loading. In the meantime, the smart phone can be stored away.

Another option to visualize the optimized loading strategy is the use of so-called "augmented reality." To that end, the recorded luggage pieces and like objects are visualized in a first step S1, and placed according to the loading strategy calculated in the second step S2 over the running camera image of the terminal device, in particular a smart phone. This facilitates a representation of the objects to be loaded at the calculated optimal place in the actual interior-/trunk space of the vehicle. The representation on the display of a smart phone then appears as if the objects were already loaded in the vehicle.

As already indicated earlier, it is also contemplated to provide the user with step-by-step directions for loading multiple objects during the visualization step S3. An optical and/or acoustical support can be used for this purpose. This type of support can also be an advantage if it allows the user to use both hands for loading the objects.

In a fourth step S4, the trunk and/or the interior space of the vehicle in general are loaded by a user according to the optimized loading strategy for the motor vehicle. It goes without saying that the steps S3 and S4 can principally be carried out at the same time.

Figure 2:
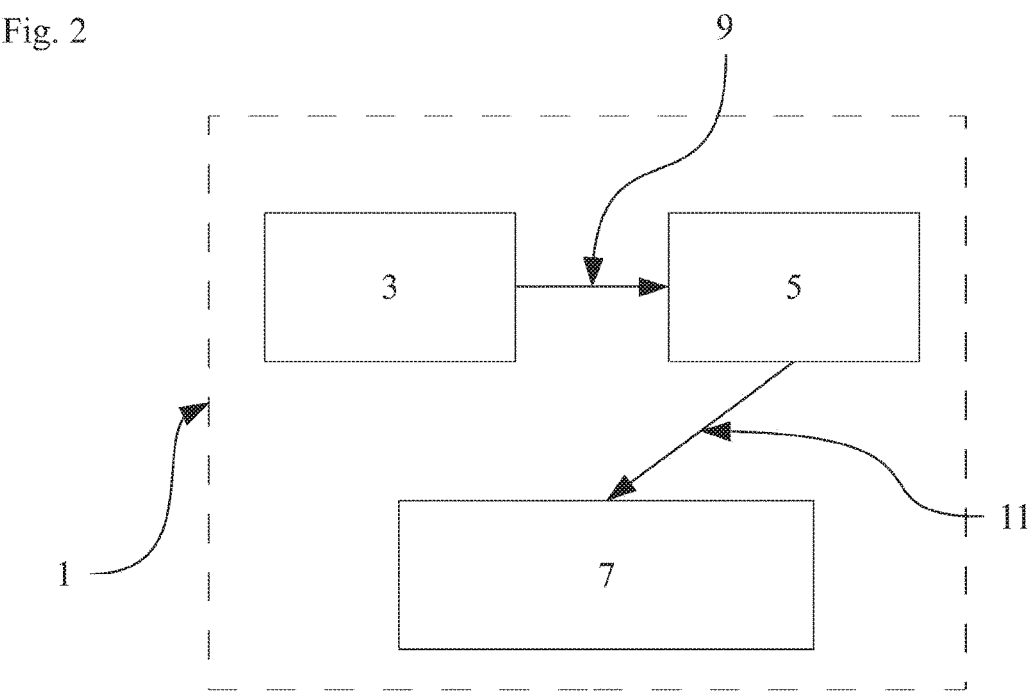
FIG. 2 is a schematic representation of a system for generating an optimized loading strategy according to the invention.

FIG. 2 shows a schematic representation of a system 1 for generating an optimized loading strategy. The system 1 includes at least one recording device 3 for acquiring dimensions, in particular the height, width and depth, of at least one object to be transported in a motor vehicle. The recording device 3 may be, for example, a bar code scanner, in particular a bar code scanner implemented in a smart phone, or a portable camera or camera. The camera can also be implemented in a smart phone as a recording device. A recording device 3 can also be a form, which can also be implemented in a graphical input screen of a smart phone or a similar terminal device. Via the form, the user can then acquire the dimension and other properties of one or a plurality of objects to be transported.

The data received from the recording device 3 about at least one object to be loaded is then transmitted to a processing unit 5 to determine the optimized loading strategy for the motor vehicle as a function of the acquired dimensions of the at least one object to be transported and as a function of the type of motor vehicle to be loaded. The processing unit 5 can furthermore create a three-dimensional model of the objects recorded in the recording device 3. Alternately, it is contemplated to accomplish creating a 3-D model of the objects to be transported already in the recording device 3, which for this purpose preferably also has a processing unit.

The processing unit 5 preferably includes a memory element to store program code, which can perform an algorithm to determine the optimal loading strategy for the motor vehicle as a function of the at least one object to be transported and as a function of the type of motor vehicle to be loaded. The result of the calculation is then graphically represented in a visualization means 7 so that the user can implement the optimal loading strategy for the objects to be loaded by using the graphic representation in the visualization means 7.

It is especially advantageous if the system 1 for the optimized loading of a motor vehicle is completely implemented in a smart phone or a similar terminal device. In that case, the smart phone display can serve as visualization device 7, whereas the camera or the display of the smart phone is used as recording device 3 to record the at least one object to be loaded. The microprocessor in the smart phone can furthermore form the processing unit 5 for determining the optimal loading strategy for the motor vehicle of system 1.

Figure 3:
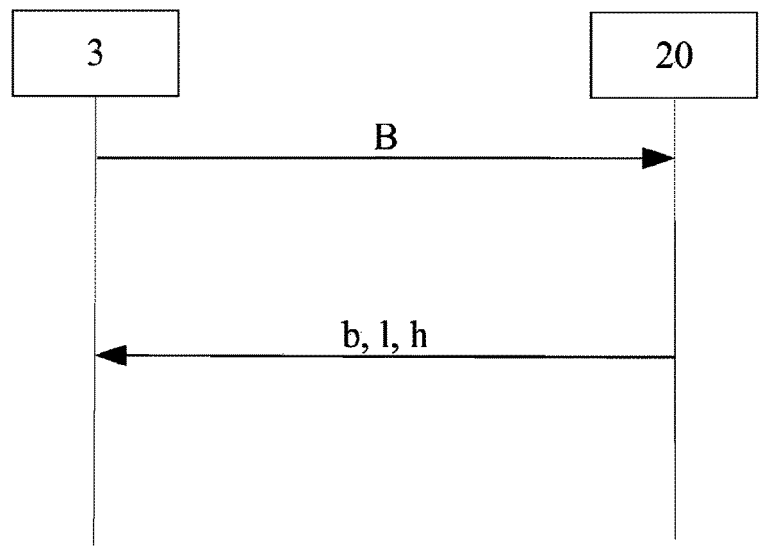
FIG. 3 is a schematic representation of the communication between a smart phone and an object server
Figure 4:
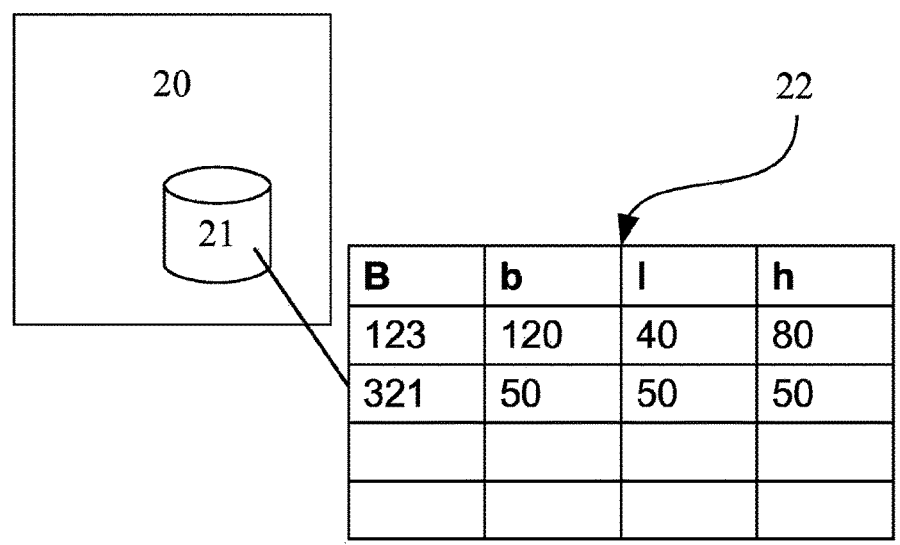
FIG. 4 is a schematic representation of the object server in FIG. 3.

In the case of barcode recording, the recording device 3 can implement the method described below. For example, the recording device 3 can record a two-dimensional code, the barcode, on the object to be transported by use of a camera of the smart phone. Using an image-processing algorithm, it is possible to translate the image of a barcode into a numerical or alphanumerical value. The alphanumerical value B can be transmitted by the recording device 3 to an object server 20 (FIG. 3). The object server 20 has an object database 21, which, for example, stores a dimension table 22 (FIG. 4). In the dimension table 22, the object server 20 searches for the alphanumerical value B and in this way can acquire the dimensions of the object provided with the barcode. In the exemplary embodiment shown in FIG. 4, the dimension table 22 has a first column for the alphanumerical value B, a second column for an object width b, a third column for the object height h, and a fourth column for the object length l. In the first column, the received alphanumerical value B is searched. Said column is therefore a reference index. As soon as a specific line has been found using the alphanumerical value B, the object width b, the object height h, and the object length can be read out.

FIG. 4 shows a dimension table 22 that describes two objects. The first object has the alphanumerical value B=123. The first object has a width of 120 centimeters, a length of 40 cm, and a height of 80 cm. A second object with the alphanumerical value B=321 has a width of 50 cm, a length of 50 cm, and a height of 50 cm. The second object is therefore square. As shown in FIG. 3, the object width b, the object length l, and the object height h are transmitted to the recording device 3. The recording device 3 can use these values to calculate an optimal loading strategy.

In the exemplary embodiment, the dimension table 22 describes the object using object width b, object height h and object length. In another exemplary embodiment, the dimension table can provide various geometrical shapes to determine the specific three-dimensional design of the object and specify them in detail. For example, a second column can list the approximate or exact geometry of the object, such as sphere, pyramid, cube, cuboid, hollow cylinder, circular cylinder, etc. and additional columns can specify the precise design. Therefore, in as far as the object is similar to a sphere, it may be sufficient to provide a radius. Hollow cylinders and circular cylinders can be specified using a height and a radius, or a height, a first radius, and a second radius.

The dimension table 22 can also be designed such that it specifies the outer casing of the object using a three-dimensional grid. With the latter embodiment of the dimension table 22, any object can be specified with sufficient accuracy. To determine a suitable loading strategy, it may be sufficient, for example, that the individual points or the nodes of the grid are spaced apart less than 15 cm, in particular less than 10 cm, and especially in particular less than 7 cm. Preferably, the number of required three-dimensional coordinates should be kept as low as possible so that the adjacent nodes preferably are spaced apart more than 1 cm, in particular more than 3 cm from each other. The outer casing of the object can also be modeled as a surface list, edge list, surface list and/or list of primitive basic shapes (such as spheres or cubes, for example).

In an exemplary embodiment according to the invention, only information determining a cuboid that at least encompasses the object to be transported is stored. For the described application, such a rough modeling of the objects to be transported is usually sufficient.

With the cuboid, conventional algorithms dealing with the container problem or bin packing can be used to determine an optimal loading strategy.

For example, objects can be sorted according to their volume and then placed into the container, e.g. the trunk, in that order.

For this purpose, the loading volume of the trunk can also be modeled as a cuboid, for example, which is filled with the individual objects. In a very simple optimization approach, the algorithm, after placing the first object, has the option of positioning the next object either on or next to the first object. Both decision options are modeled in a decision diagram. In one embodiment, the algorithm always opts first for placement next to the first object. For the next object, there may only be the option of placing it on the first or on the second object. Here too, the algorithm can follow a specified strategy and enter the decision as well as the optional decisions into a decision diagram. This strategy is followed until either the trunk space is filled with the number of desired objects (=goal achieved), or the goal (loading the trunk space) has not been achieved. In the latter case, the algorithm runs back on the decision diagram and makes another decision at one of the branches. For example, in the placement of the second object, the algorithm can decide to place the second object on top of the first object and not next to the first object. Then loading continues in the known manner until either the goal has been achieved or not. With this iterative method, it is possible to determine in a relatively simple way if and how the trunk is to be loaded.

Some of the algorithms for determining an optimal loading strategy are described in the book "Solution Techniques for Specific Bin Packing Problems with Applications to Assembly Line Optimization" by Wolfgang Stille.

In the aforementioned embodiments, the recording device 3 communicates with the object server 20 to determine the dimensions of the objects. In another embodiment, the recording device 3 facilitates the selection of a specific object category. For this purpose, a corresponding graphical user interface may be provided. For example, the user can enter that the objects to be loaded are IKEA cardboard packing boxes. The recording device 3 will then contact an administration server 40 (FIG. 5) that knows a multitude of object servers 20, 20'. For example, the administration server 40 uses a table to determine a suitable object server 20, 20', which knows the dimensions of the objects from the selected object category. For example, using a server database 41, the administration server 40 can select a suitable object server 20, 20' and then forward the inquiry by the recording device 3 to the object server 20, 20'. Likewise, the administration server 40 can transmit the address of the object servers 20 or 20' to the recording device 3 and request the recording device to contact the object server 20 or 20' directly. Alternately, the administration server 40 can regularly request the entries of the object servers 20, 20' and store the dimensions of the objects with a reference to the object category.

Figure 5:
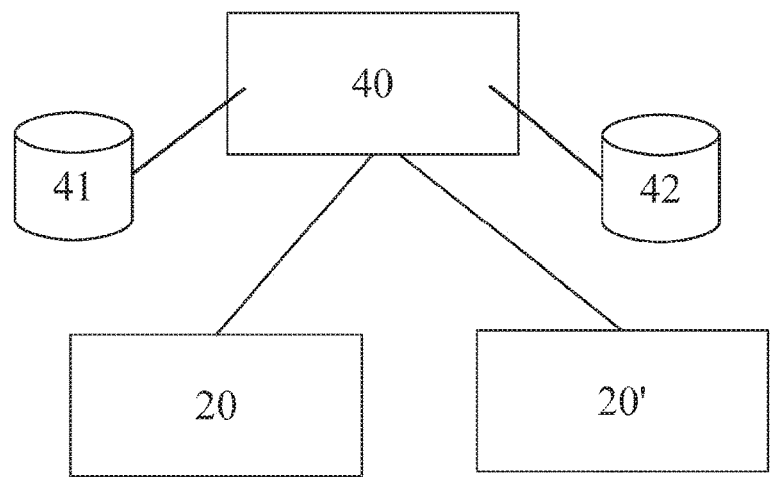
FIG. 5 is a schematic representation of an administration server to establish a communication with object servers.

As shown in FIG. 5, the administration server can furthermore include a vehicle database. The vehicle database can have at its disposal information that allows determining information about the available loading space based on the type of vehicle. For example, the smart phone, which was already explained earlier, can contact the administration server 40 to obtain information for a specific type of vehicle, which specifies the loading volume of the vehicle's trunk and its geometrical design. It goes without saying that it is possible to specify the loading volume by means of more complex geometrical bodies. For example, to this end, grids, lists of surface areas and/or primitive geometrical shapes can be used here as well to model the objects. However, very good results are already achieved by using only a few cuboids (less [than] 5 or less [than] 3, for example), which specify the loading space with sufficient accuracy. In as far as corresponding cuboids are used, known algorithms can be used to optimize the loading strategy. However, according to the invention, it is also possible to adapt the known algorithms to other geometrical bodies that specify the loading space in greater detail.

With the known exemplary embodiment, a one-dimensional code, that is to say, a barcode, was used to identify the objects to be loaded. According to the invention, it is possible to use a two-dimensional code, for example a QR code, to identify the objects to be loaded. It is also possible to use a camera to record a numerical or alphanumerical series of symbols and supply them to a text recognition program.

As already explained, the recording device 3 can also optically acquire the dimensions of the object to be transported. To that end, various images of the object to be transported from various directions can be used. According to the invention, such images will be taken by the smart phone camera. The smart phone simultaneously records the position and orientation of the camera so that the dimensions of the object can be reconstructed. In one exemplary embodiment, the recording device 3 assumes that the objects to be transported are objects of a cuboid form. In so far, the objects to be transported and/or their dimensions can be reconstructed relatively easily using the 2D-images. In one exemplary embodiment, the administration server 40 has calibration data for the camera of the respective smart phone at its disposal. In another exemplary embodiment, corresponding calibration data is provided together with the software that is installed on the smart phone.

Furthermore, it is also possible according to the invention to use reference objects to be able to quickly acquire the dimensions of the objects to be transported. For example, the recording device 3 can have information that provides the type of vehicle and therefore the trunk opening. In as far as objects to be loaded are recorded together with the trunk opening, the knowledge obtained about the dimensions of the opening can be used to make very specific statements about the dimensions of the objects to be loaded. According to the invention, other vehicle components (such as wheel, gas cap, hood, rear lights, front lights, bumpers) can also be used to serve as reference objects for acquiring the dimensions of the objects to be loaded. Preferably, the components should be easily detectable within an image. A vehicle tire is very suitable for this purpose because it usually has the same color scheme and an easily distinguishable geometrical shape (round). The dimensions of the vehicle components can also be stored either centralized, for example in the administration server 40 or decentralized, such as on the smart phone or in a readable memory of the vehicle.

In an embodiment according to the invention, the recording device 3, the processing unit 5 and the visualization device 7 of the system 1 are integrated into various overriding systems. For example, it is contemplated to implement the recording device 3 in a smart phone, whereas the processing unit 5 is arranged in the motor vehicle to be loaded, for example in a control device, or on an external server, in particular a server of the manufacturer of the motor vehicle. For example, the administration server 40 can assume the function of the external server. The visualization device 7 can again be provided either in a smart phone or in the motor vehicle to be loaded. In as far as the elements 3, 5 and 7 of system 1 are assigned to various overriding systems, communication interfaces 9 and 11, for example in the form of USB, Bluetooth or the mobile communications network, must be developed to obtain a functioning system.

Overall, the present invention provides an advantageous method and a corresponding system for the optimized loading of a motor vehicle using an optimized loading strategy, wherein a computer determines the optimized loading strategy. The method/system according to the invention allows for a clearly better utilization of the loading potential and the loading function of the motor vehicle to be loaded. Furthermore, larger transports can be optimally planned. Loading can furthermore already be planned during the shopping trip, for example when shopping for furniture. Furthermore, expenses can be reduced because rental transport vehicles are required only if the objects to be transported really do not actually fit into the own motor vehicle. Furthermore, the surface of the vehicle is protected, which applies in particular for bulky pieces of luggage, because loading attempts by the user are not necessary. Also, a higher driving safety is achieved because of an optimal loading strategy as desired by the vehicle's manufacturer.

A method according to the invention for loading a motor vehicle by utilizing an optimized loading strategy, wherein the optimized loading strategy is determined by a computer, has the following steps:

user-supported acquiring of dimensions, in particular the height, width and depth of at least one of the objects to be transported in the motor vehicle;

determining the optimized loading strategy for the motor vehicle as a function of the acquired dimensions of the at least one object to be transported and as a function of the type of motor vehicle to be loaded, and visualizing the optimized loading strategy.

LIST OF REFERENCE SYMBOLS

B Barcode (alphanumeric)
b Width of object
h Height of object
l Length of object
1 System
3 Recording device
5 Processing unit
7 Visualization device
9 Communication interface
11 Communication interface
10, 20' Object server
21 Object database
22 Dimension table
40 Administration server
41 Server database
42 Vehicle database
S1 Step 1
S2 Step 2
S3 Step 3
S4 Step 4

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for calculating a loading strategy for a motor vehicle, the method comprising the acts of:
   acquiring, via a recording device, characteristics of a plurality of objects to be transported;
   inquiring about an expiration date, a storage specification and/or a temperature specification for at least one of the plurality of objects based on the acquired characteristics;
   determining dimensions of each of the objects based on the acquired characteristics;
   determining an optimized loading strategy for the motor vehicle based on (i) the determined dimensions of the objects, (ii) a type of the motor vehicle to be loaded, and (iii) the expiration date, the temperature specification and/or the storage specification of the at least one object; and
   displaying the optimized loading strategy on an electronic display.

2. The method according to claim 1, wherein the characteristics comprise a one-dimensional or two-dimensional code.

3. The method according to claim 1, wherein the act of acquiring the characteristics of each of the objects is carried out via at least one stereo camera arranged at a rear of a motor vehicle.

4. The method according to claim 1, further comprising the act of:
   communicating with a server to acquire the dimensions of each of the objects based on the acquired characteristics.

5. The method according to claim 1, wherein the method is carried out in one or more of a smart phone, an external server or the motor vehicle to be loaded.

6. The method according to claim 1, wherein the method is implemented in a smart phone application for a specific motor vehicle.

7. The method according to claim 1, wherein information about the type of motor vehicle to be loaded is stored, the method further comprising the acts of:
   inquiring about a trunk space of the motor vehicle to be loaded as a function of the type of the motor vehicle, and/or
   inquiring about loading specifications of the motor vehicle to be loaded as a function of the type of motor vehicle.

8. The method according to claim 7, wherein the act of determining the optimized loading strategy takes into account the loading specifications for the type of motor vehicle to be loaded and a maximally usable volume of an interior space of the motor vehicle to be loaded.

9. The method according to claim 7, further comprising the acts of:
   receiving a parameter input regarding a number of passengers traveling in the motor vehicle; and
   using the parameter input in inquiring about a loading space of the motor vehicle.

10. The method according to claim 1, wherein the optimized loading strategy takes into account a loading strategy prioritizeable by a user of the motor vehicle.

11. The method according to claim 1, further comprising the act of:
   using the acquired characteristics to inquire about a weight of at least one of the plurality of objects, wherein
   the weight of the at least one object is factored into account when determining the optimized loading strategy.

12. The method according to claim 1, further comprising the act of:
   transmitting the optimized loading strategy, said strategy being determined via a smart phone, to the motor vehicle to be loaded, wherein the visualizing of the loading strategy takes place on a motor vehicle display.

13. The method according to claim 1, wherein the loading strategy provides information about placement of the plurality of objects to be transported in the motor vehicle.

14. The method according to claim 13, further comprising the act of:
    providing one or more voice prompts that specify placement of the plurality of objects to be transported.

15. A method for calculating a loading strategy for a motor vehicle, the method comprising the acts of:
    acquiring, via a recording device, characteristics of a plurality of objects to be transported;
    determining dimensions of each of the objects based on the acquired characteristics;
    determining an optimized loading strategy for the motor vehicle based on the determined dimensions of the objects and a type of the motor vehicle to be loaded;
    displaying the optimized loading strategy on an electronic display; and
    actuating optical devices to indicate the placement of the plurality of objects to be transported in the motor vehicle according to the optimized loading strategy.

16. A method for calculating a loading strategy for a motor vehicle, the method comprising the acts of:
    acquiring, via a recording device, characteristics of a plurality of objects to be transported;
    determining dimensions of each of the objects based on the acquired characteristics;
    determining an optimized loading strategy for the motor vehicle based on the determined dimensions of the objects and a type of the motor vehicle to be loaded; and
    displaying the optimized loading strategy on an electronic display,
    wherein the method further comprises one or more of the following acts:
        opening or locking of a vehicle door or a trunk lid based on the loading strategy, and
        activating external or internal lighting of the motor vehicle based on the loading strategy.

* * * * *